2,860,963
MONOHEMIACETAL

Warren C. Ellis, Columbus, Daniel C. Rowlands, Worthington, and Donald P. Uhl, Columbus, Ohio, assignors, by mesne assignments, to Air Reduction Company, Inc., New York, N. Y., a corporation of New York No Drawing. Application September 14, 1955
Serial No. 534,379

7 Claims. (Cl. 71—2.7)

This invention relates to a novel chemical compound and to a process of preparing the same. This invention further relates to plant growth regulants and is particularly directed to plant regulant compositions containing as an essential active ingredient the novel chemical compound of this invention.

In the science of phytology, or plant physiology, plant growth substances are hormone-like chemicals which affect the growth and maturation of plants. These regulators have been isolated from such sources as pollens, seeds, and plants, and their chemical structures have been identified. In addition, a number of synthetic compounds have also been discovered, which display regulatory effects similar to those of the naturally occurring products. These plant growth substances in very small quantities control, regulate, and integrate the different activities of plants.

One object of this invention is to provide a novel compound and a method of making the same.

A further object is to provide a new and improved plant growth regulant.

A still further object is to provide an improved plant regulant composition employing as an active ingredient the novel compound of this invention.

These and other objects and advantages of the present invention will become more apparent from the following description of specific embodiments of the invention.

The novel chemical compound is 1-(2′,5′-dimethyl-3′-hexyn-5′-ol-2′-oxy)-2,2,2-trichloroethanol, the monohemiacetal of chloral and 2,5-dimethyl-3-hexyne-2,5-diol. It can be represented by the formula:

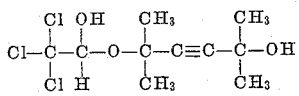

This compound can be obtained by reacting one molecule of 2,5-dimethyl-3-hexyne-2,5-diol with one molecule of chloral in an inert liquid medium and in the presence of a suitable catalyst. The procedure used for preparation was as follows:

EXAMPLE I 2,5-dimethyl-3-hexyne-2,5-diol (42.6 g., 0.3 mole) was refluxed with a mixture of chloral (59.1 g., 0.4 mole), benzene (100 ml.), and about 25 g. of calcium chloride, over a period of six hours, at room temperature. The calcium chloride was separated by filtration, and substantially all of the benzene was removed under reduced pressure. Petroleum ether was added, and the resulting mixture was cooled. This precipitated the product which, when dried, weighed 50.5 g. and melted at 85–87.5° C. The material was then recrystallized from mixed benzene and petroleum ether to obtain a purer sample (35.0 g., M. P. 91.0–92.5° C.). While this gave a large depression in melting point with the dimethylhexynediol, the chlorine analysis indicated the product was still not very pure (found 30%; theoretical, 36.7% for $C_{10}H_{15}O_3Cl_3$). The crude monohemiacetal (30.0 g., 30% chlorine) was taken up in a solvent consisting of three parts benzene and one part chloroform and washed six times with an equal volume of water. The solvent was removed, and the residue was crystallized from petroleum ether to obtain 12.2 g. of purified product (M. P. 88.5–89.5° C.). The chlorine analysis now indicated 36.8% chlorine, the theoretical amount of chlorine in the monohemiacetal being 36.7%.

The following table shows the plant regulatory effects of the novel monohemiacetal on several species of plants when it was put through various plant-growth-regulator screening tests. The compound was used at 1 percent concentration in all cases. The general significance of all numerical ratings is 0=no effect, to 4=very severe effects.

Table I

| Seed Germination [a] | | | | | | Lanolin Paste [b] | | | | Leaf Dip | | Total Spray | | |
|---|---|---|---|---|---|---|---|---|---|---|---|---|---|---|
| Cucumber | | | Wheat | | | Cucumber | | Soybean | | Cucumber | Tomato | Soybean | Tomato | Wheat |
| E | G | D | E | G | D | L | S | L | S | | | | | |
| 0 | 2 | 1 | 4 | 4 | 4 | 0 | 0 | 0 | 0 | 1 | 1 | 1 | 1 | 1 |

[a] E=emergence; G=growth; and D=damage to seedling.
[b] L=leaf; and S=stem.

The selectivity of the novel monohemiacetal, as shown in the results of the seed-germination test tabulated above, was investigated further by similar experiments using lower concentrations of the compound. The following observations were made:

Table II

| Concentration | Effects on— | |
|---|---|---|
| | Cucumbers | Wheat |
| 0.5% | None | Barely emerged, followed by death of 75% of the plants. |
| 0.3% | do | Growth stopped at ¼ size of controls. |
| 0.1% | do | Do. |

The results above indicate that the novel hemiacetal is a selective plant growth regulant. Use of the compound at lower concentrations markedly suppressed the growth of wheat seedling. Its selectivity resembles that of maleic hydrazide or an m-chlorophenyl isopropyl carbamate, since the novel compound in the proper concentrations can inhibit or kill the noxious species without harming the desirable species.

Often a soil is sprayed after the seeds are planted to prevent or inhibit growth of noxious weeds until the crop plants are well established. The plant growth regulant thus employed is generally known as a "pre-emergence herbicide." In the following examples showing the effects of the novel monohemiacetal as a pre-emergence herbicide, the crop seeds were planted in quart berry baskets; the weed seeds were then broadcast in each basket and lightly covered with soil; and the soil sprayed with aqueous solutions of the compound at the appropriate rates. The baskets were allowed to remain under standard conditions of sunlight and watering for a period of two weeks, at which time final observations were made.

*Table III*

| Concentrations, pounds per acre | Effects on the following kind of seedlings * | | | | Weed—Ryegrass |
|---|---|---|---|---|---|
| | Crops | | | | |
| | Corn | Cotton | Soybean | Wheat | |
| 100 | 4 | 1 | 4 | 2-3 | 3-4 |
| 50 | 3-4 | 0 | 3 | 2-3 | 3-4 |
| 25 | 3 | 0 | 3 | 2-3 | 2-3 |
| 12.5 | 2 | 0 | 2-3 | 1 | 0-1 |

* Numerical ratigs are 0=no injury, to 4=very severe injury.

The data in Table III shows that the novel mono-hemiacetal is a good pre-emergence herbicide. It has very little effect on either cottonseed germination or cotton plants at various stages of growth, but at the proper concentration it kills weeds without injuring the main crop. The reason for this selective activity is not well understood, but it is belived that one explanation lies in the degree of physiological resistance of the various plants to the novel compound.

From comparative tests, we have found that the novel compound tends to be less injurious to cotton that several conventional pre-emergence herbicides. It appears to be particularly effective as a pre-emergence herbicide for certain broad-leafed crops.

In the application of the novel compound for regulating the growth characteristics of the plant, different compositions may be employed. With an oily liquid such as the monohemiacetal of this invention, aqueous solutions are satisfactory. Two to ten parts of an emulsifying agent, preferably a long-chain fatty acid, are added to 100 parts of the regulant, and the mixture is homogenized to make a stock solution. This solution may then be mixed with water in the desired concentration ready for use. These solutions may include wetting agents and/or adhesives. Hydrocarbon solvents may be used as carriers for the plant growth regulant, in conjunction with the appropriate emulsifying agents. The compound may also be applied in admixture with other diluents either as pastes or as agricultural dusts. For example, the compound may be incorporated in lanolin to form a paste; or it may be mixed with finely-divided inert materials such as fuller's earth and diatomate to form an agricultural dust. Dust formations are widely used on vegetable and field crops which are difficult to cover with conventional sprays. Generally speaking therefore the carrier for the novel monohemiacetal may be selected from a group consisting of an aqueous emulsion, finely-divided solid, and a hydrocarbon solvent, all of which are substantially inert with respect to the novel compound. Polymerized organic salts of alkyl-aryl types are frequently added as dispersing agents in dust formulations.

It is to be understood that the invention is not limited to the specific examples described above but may be practiced in other ways without departing from the spirit and scope of the invention as defined in the following claims.

We claim:
1. A new chemical compound, 1-(2',5'-dimethyl-3'-hexyn-5'-ol-2'-oxy)-2,2,2-trichloroethanol.
2. A plant regulant composition comprising 1-(2',5'-dimethyl-3'-hexyn-5'-ol-2'-oxy)-2,2,2-trichloroethanol as an essential active ingredient and a carrier which is substantially inert with respect to said ingredient, the amount of said ingredient being sufficient to effect the desired plant regulatory action.
3. The composition of claim 2 wherein said carrier comprises a finely-divided solid.
4. The composition of claim 2 wherein the carrier comprises a liquid.
5. A plant regulant composition comprising 1-(2',5'-dimethyl-3'-hexyn-5'-ol-2'-oxy)-2,2,2-trichloroethanol as an active ingredient and a carrier which is substantially inert with respect to said ingredient, said active ingredient being present in an amount sufficient to effect a pre-emergence herbicidal action.
6. A plant regulant composition comprising 1-(2',5'-dimethyl-3'-hexyn-5'-ol-2'-oxy)-2,2,2-trichloroethanol as an active ingredient and an emulsifying agent, the resulting composition being emulsifiable with water to form a stable emulsion, and the amount of said ingredient being sufficient to effect the desired plant regulatory action.
7. In the propagation of plants, a method of regulating the growth characteristics of the plant which comprises treating the plant with the monohemiacetal 1-(2',5'-dimethyl-3'-hexyn-5'-ol-2'-oxy)-2,2,2-trichloroethanol and a carrier which is substantially inert with respect to said monohemiacetal, the amount of said monohemiacetal being sufficient to effect the desired growth.

References Cited in the file of this patent

UNITED STATES PATENTS

| 2,555,601 | Newman | June 5, 1951 |
| 2,657,241 | Mast et al. | Oct. 27, 1953 |

FOREIGN PATENTS

| 676,770 | Great Britain | Aug. 6, 1952 |